United States Patent [19]

Phipps et al.

[11] 4,371,488

[45] Feb. 1, 1983

[54] METHOD AND APPARATUS FOR EXTRUDING FOAMED BODIES INVOLVING THE USE OF ADJUSTABLE TRACTION SHAPING ROLLS

[75] Inventors: Arthur L. Phipps, Tallmadge; Ben Stoyanov, Akron, both of Ohio

[73] Assignee: U.C. Industries, Tallmadge, Ohio

[21] Appl. No.: 250,266

[22] Filed: Apr. 2, 1981

[51] Int. Cl.³ .................. B29D 27/00; B29F 3/01; B29D 7/24

[52] U.S. Cl. .................. 264/51; 264/210.7; 425/325; 425/817 C

[58] Field of Search .................. 264/51, 53, 210.7; 425/325, 817 C

[56] References Cited

U.S. PATENT DOCUMENTS 4,199,310 4/1980 Phipps .................. 264/51 X
4,234,529 11/1980 Phipps .................. 264/51

FOREIGN PATENT DOCUMENTS 46-11598 3/1971 Japan.

Primary Examiner—Philip E. Anderson
Attorney, Agent, or Firm—Maky, Renner, Otto & Boisselle

[57] ABSTRACT

An improved method and apparatus using edge shaping and traction rolls is disclosed for shaping and forming plastic foams as a foamable extrudate is extruded through an arcuate orifice of an extrusion die. Immediately adjacent and downstream of the die orifice are opposed sets of curved rolls, each having substantially the same center of curvature as the die orifice and being positioned, respectively, on opposite sides of the extrudate pass line. Moreover, two pairs of traction shaping rolls downstream of the curved rolls engage edge portions of the extrudate further to assist in shaping the same especially in connection with the shaping and forming of relatively wide bodies of plastic foam material. Several parameters of the traction rolls may be adjusted to selected values affecting the force and direction applied by such rolls to the extrudate. Parameters such as compression force, slippage, angle of attack, and/or surface area of the extrudate over which such forces may be applied, may be remotely adjusted.

28 Claims, 6 Drawing Figures

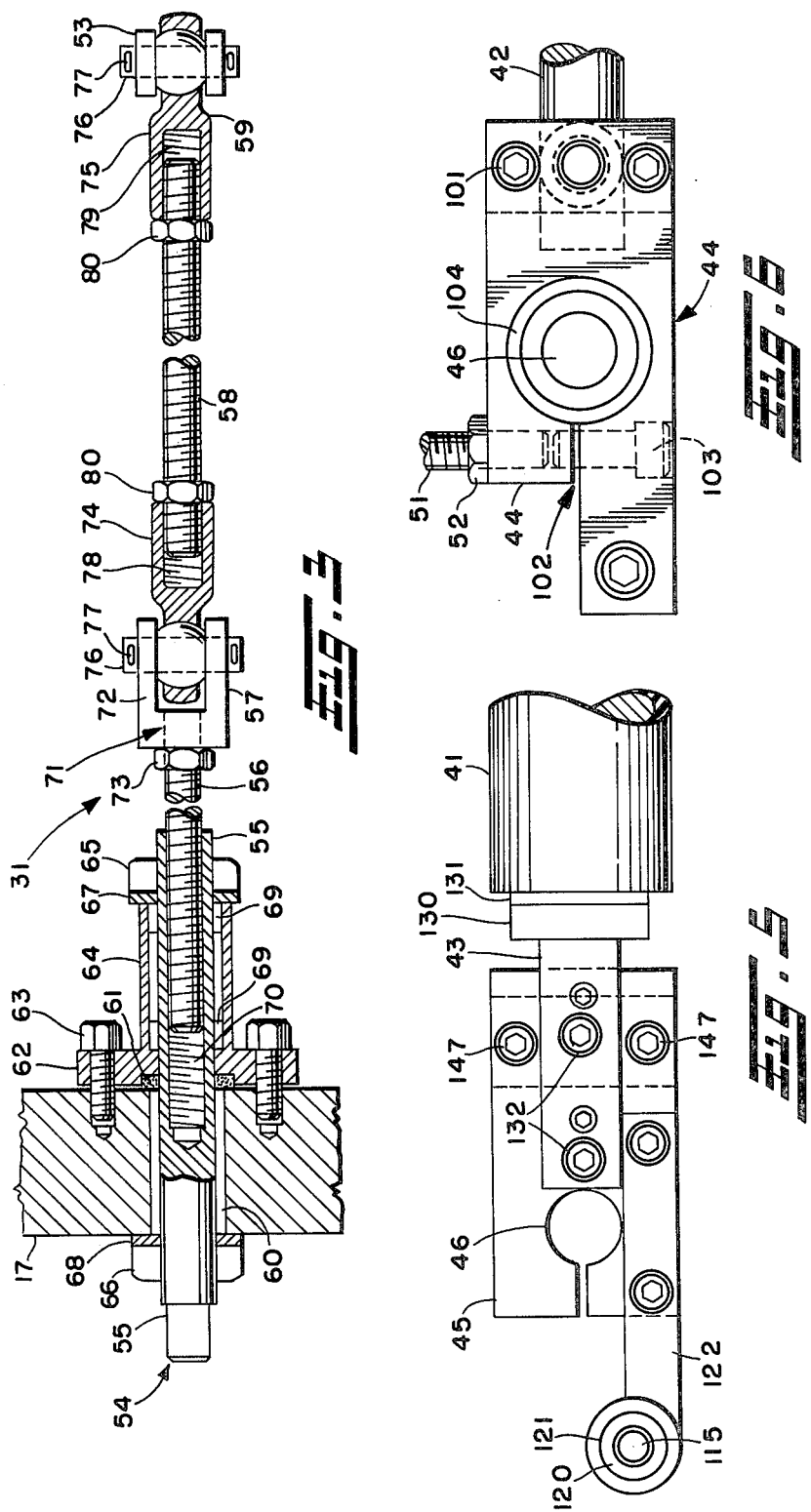

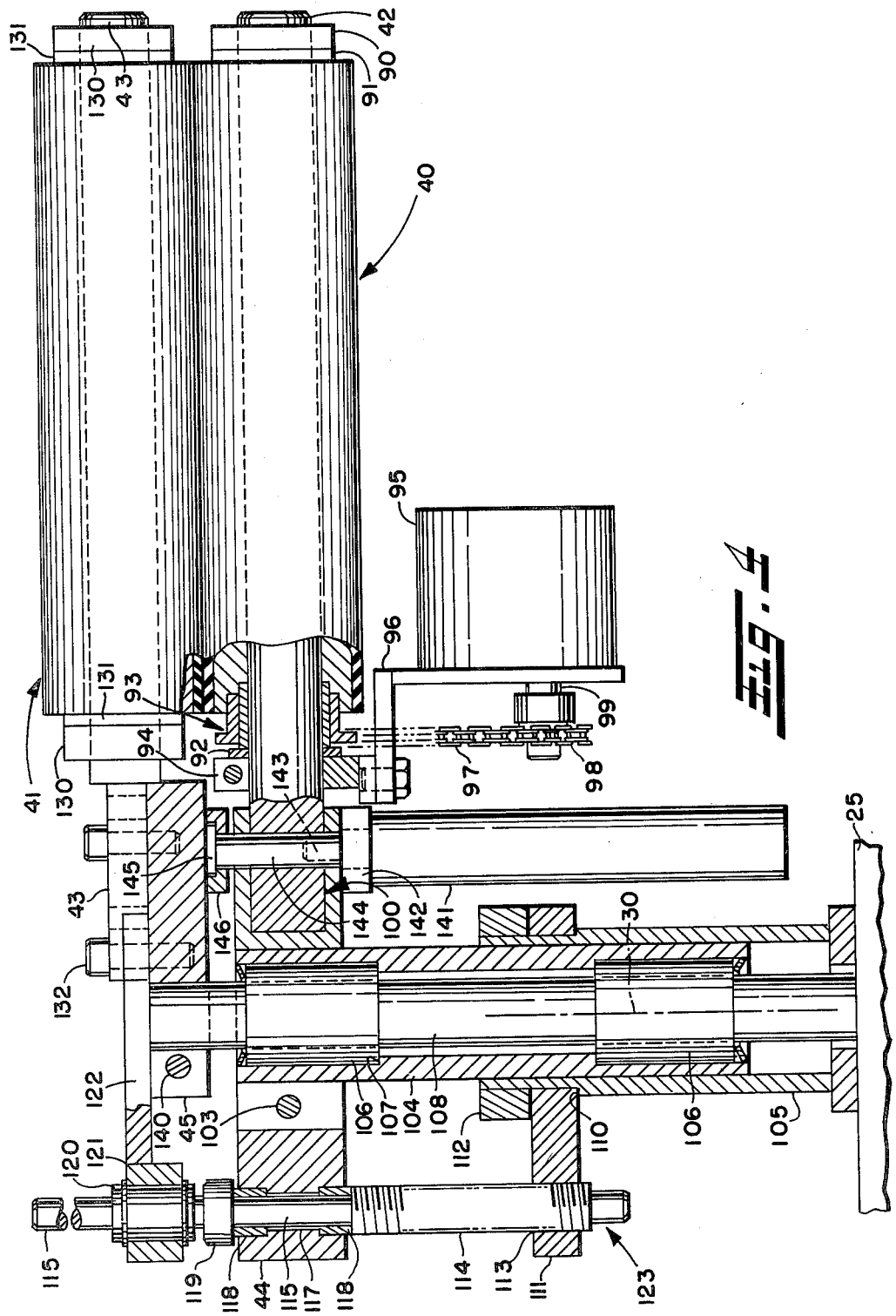

4,371,488

METHOD AND APPARATUS FOR EXTRUDING FOAMED BODIES INVOLVING THE USE OF ADJUSTABLE TRACTION SHAPING ROLLS

TECHNICAL FIELD

This invention relates to an improved foam extrusion method and apparatus using adjustable traction shaping rolls for shaping and forming elongated bodies of plastic foam during formation of such bodies upon extrusion through a die orifice to obtain foam or cellular boards, slabs, billets or the like of substantially uniform thickness requiring little subsequent processing.

BACKGROUND OF THE INVENTION

In the production of rigid foam billets, boards, slabs, logs, or the like, a foamable thermoplastic resin, such as styrene or the like, incorporating a blowing agent is extruded through a die orifice. As soon as the extrudate leaves the die orifice, it is at a much lower pressure, preferably a vacuum, and immediately begins to expand three dimensionally and move away from the die orifice. If such expansion is not properly controlled and the extrudate properly drawn from the die orifice, particularly as the extrudate cools and begins to cure or to set, undesirable dimensional variations may result, such as corrugations and density and/or cell orientation variations. Also, it is desirable to finish the product as nearly as possible at a uniform thickness with planar top and bottom surfaces as the product is so formed. The finished product, then, need only be cut transversely with perhaps lateral edge trimming, or tongue and grooving. It is important that the product be of uniform density and uniform thickness and have minimum cell distortion; and it also is important that the finished surface be free of distortions, surface blemishes or cracks.

In U.S. Pat. No. 4,234,529 there is disclosed a method and apparatus for shaping plastic foams extruded through an arcuate extrusion die with the extrudate being conducted past several sets of curved rolls. Each set of curved rolls includes two of the same respectively located on opposite sides of the extrudate pass line. The center of curvature of each curved roll is approximately at the center of curvature of the arcuate extrusion die orifice. At least one curved roll of each set thereof is independently driven to rotate the same, and at least one curved roll of each set thereof is movable to adjust the spacing between the same and the other curved roll of such set. The extrusion die, curved rolls, and a surface finisher, if employed, are located in a controlled environment, such as a vacuum.

While angularly related high pressure pinch rolls are employed for stretching of non-foaming extrudates such as in biaxially orienting film, as seen in Japanese publication No. 11598/71, an expanding board or billet of some thickness presents problems of a different sort, particularly where the foaming and shaping occurs in a vacuum.

The several features and advantages of the method and apparatus disclosed in U.S. Pat. No. 4,234,529 also are relevant to the instant invention. Accordingly, the entire disclosure of such patent hereby is incorporated by reference.

It is desirable to provide additional forming and shaping capability for an extruding apparatus, such as that disclosed in such patent, especially to facilitate maintaining high quality in the production of relatively wide boards or billets of extruded plastic foams.

SUMMARY OF THE INVENTION

The invention, then, relates to an apparatus for and method of providing such additional capability by means of adjustable edge forming or shaping rolls and in the combination of such rolls or use thereof in an extruding apparatus and method of the type disclosed in U.S. Pat. No. 4,234,529. The edge rolls preferably are located downstream of the extrusion die and the curved rolls. Although the curved rolls preferably extend fully across both major surfaces of the extrudate, the edge rolls are arranged in pairs with at least one pair near one edge portion of the extrudate, and a second pair near the other edge of the extrudate. Preferably the edge roll pairs are located only near respective edges of the extrudate.

An auxiliary edge roll pair includes two linear rolls respectively on opposite sides of the extrudate pass line. The angle of attack of such rolls, e.g. the angular relation of the rolls or their linear axes to the principal direction of movement of the extrudate between the rolls, may be remotely adjusted. Remote adjustment capability facilitates adjustment without interfering with the controlled environment in which the extruding, foaming and shaping occur. The auxiliary rolls may be adjusted to change the spacing between the rolls, for example by moving one roll while maintaining the other roll in a plane that is substantially common with that of the curved rolls and a surface finisher on the same side of the extrudate pass line to accommodate extrudates of different thicknesses and to adjust the forces applied by such rolls to the extrudate. The spacing between pairs of rolls at opposite edges of the extrudate also can be adjusted to alter the extent of the edge portions of the extrudate over which the rolls extend or the width of the extrudate that can be accommodated by such rolls. Such adjustability allows an operator to vary the controlling forces applied by such rolls to form the extrudate to a desired width.

To assure accuracy of the aforesaid remote adjustment and to maintain a high quality of the finished product, it is desirable to hold substantially constant the relative orientation of the two rolls of each pair. Accordingly, the two rolls are mounted for pivoting about a common pivot axis, and a remotely operable actuator may be employed accurately to control such pivoting.

According to the method of the invention, a method of controlling and shaping a foaming extrudate exiting from a die orifice includes the steps of directing the extrudate through and in engagement with sets of rolls that extend at least substantially across the surfaces of the extrudate on opposite sides thereof, further directing only the opposite edge portions of the extrudate through and in engagement with respective pairs of further rolls downstream of the sets of rolls, and respectively adjusting such pairs of further rolls.

With the foregoing in mind, it is a principal object of the present invention to provide an improvement in foam extrusion.

Another object is to facilitate production of relatively wide boards, billets, or the like of plastic foam, especially while maintaining high quality of production.

An additional object is to provide adjustable edge forming rolls for use in a foam extrusion apparatus and method.

A further object is to adjust the shaping compression force applied to the edge portions of a board, billet or like extrudate.

Still another object is to adjust the pulling force applied, especially by driven edge rolls, to edge portions of a board, or like foam extrudate.

Still an additional object is to adjust the angle of attack of edge-located rolls used in extruding, shaping and forming a foam extrudate.

Still a further object is to effect remote adjustment of the angle of attack of such rolls relative to a foam extrusion passing therebetween, especially without interfering with the controlled environment in which extruding, forming, and/or shaping are carried out.

Even another object is to combine an adjustable edge roll assembly and use thereof in an expanding foam extrusion apparatus and method, especially to form a relatively wide extrudate emanating initially from an appreciably narrower extrusion die.

These and other objects and advantages of the present invention will become more apparent as the following description proceeds.

To the accomplishment of the foregoing and related ends, the invention, then, comprises the features hereinafter fully described and particulary pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWINGS

In said annexed drawings:

FIG. 3 is an enlarged section view of the actuating arm for the remotely operable angle of attack adjusting mechanism looking generally in the direction of the arrows 3—3 of FIG. 1;

FIG. 4 is an enlarged side elevation view of an adjustable edge roll assembly looking generally in the direction of the arrows 4—4 of FIG. 1;

FIG. 5 is a top plan view of the upper mounting bracket assembly for mounting an upper edge roll of an adjustable edge roll assembly; and FIG. 6 is a plan view of the lower mounting bracket assembly for the lower edge roll of an adjustable roll assembly.

DETAILED DESCRIPTION

Figure 1:
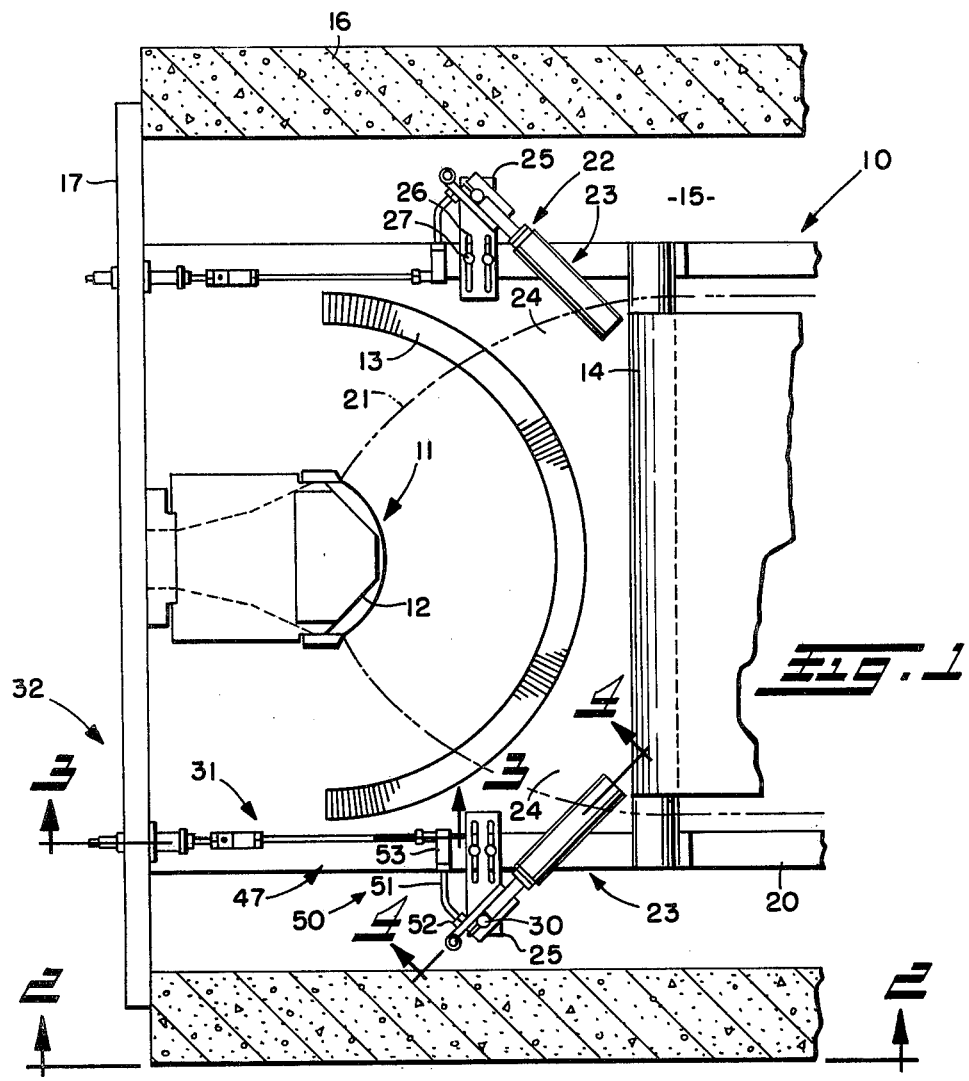
FIG. 1 is a plan view of a foam extrusion apparatus using edge rolls in accordance with the present invention.

Referring now in detail to the drawings, and initially to FIG. 1, a foam extrusion apparatus in accordance with the present invention is generally indicated at 10. The apparatus 10 includes an extrusion die 11, preferably having an arcuate orifice 12, several sets or pairs of curved shaping rolls schematically illustrated at 13 with the rolls of each pair being located, respectively, on opposite sides of the extrudate pass line, and a conveyor and/or surface finisher 14, all of which preferably are generally of the type disclosed in U.S. Pat. No. 4,234,529. The components 11–14 preferably are located within a controlled environment 15, such as a vacuum, confined within partially illustrated chamber walls 16 and end wall or bulkhead 17. A liquid barrier or other means may be provided at the downstream end of the controlled environment 15 to maintain isolation between the vacuum therein and the external atmosphere, for example, as it is disclosed in U.S. Pat. No. 4,199,310.

A rigid frame support 20 supports the conveyor 14 and may provide support for the sets of curved rollers 13 and/or the extrusion die 11. Other means of support also may be provided, for example, as is disclosed in the U.S. Pat. No. 4,234,529, to obtain the desired interaction of parts in forming, shaping, or directing the extrudate 21 from the extrusion die 11 to an exit, not shown, from the controlled environment 15 preferably as a substantially finished product of expanded foam board or like type material.

The foam extrusion apparatus 10 also includes, as is seen in FIG. 1, an edge roll apparatus 22. The edge roll apparatus 22 has two adjustable roll assemblies 23 positioned, respectively, at opposite edge portions 24 of the extrudate 21 to extend across only such respective edge portions, this being in contrast to the sets of curved rolls 13 which extend fully across the extrudate 21. Support plates 25 support the roll assemblies 23 from the rigid frame support 20 opposite respective edges of the extrudate 21, substantially opposed to each other, and approximately equidistant from the center of the extrudate and from the extrusion die 11 at a location between the sets of curved rollers 13 and the conveyor 14. Slots 26 permit lateral adjustment of the roll assemblies 23 relative to each other. Fasteners 27 may be tightened to secure the roll assemblies 23 to the rigid frame support 20. By adjusting the relative lateral spacing between the roll assemblies 23, the magnitude of the distance such roll assemblies extend across the extrudate 21 can be adjusted thereby to effect corresponding adjustment of the engaged width of the extrudate edge portion 21.

Each roll assembly 23 also can be pivoted angularly about a pivot shaft 30. To effect such pivoting, an actuating arm 31 may be moved substantially longitudinally from a location 32 outside of the controlled environment 15, as will be described in further detail below. Such remotely controlled pivoting by the mechanical linkage of the actuating arm 31 permits accurate control of the pivot swing of the roll assembly 23 about the pivot axis 30 with facility and without disturbing the controlled environment 15.

Figure 2:
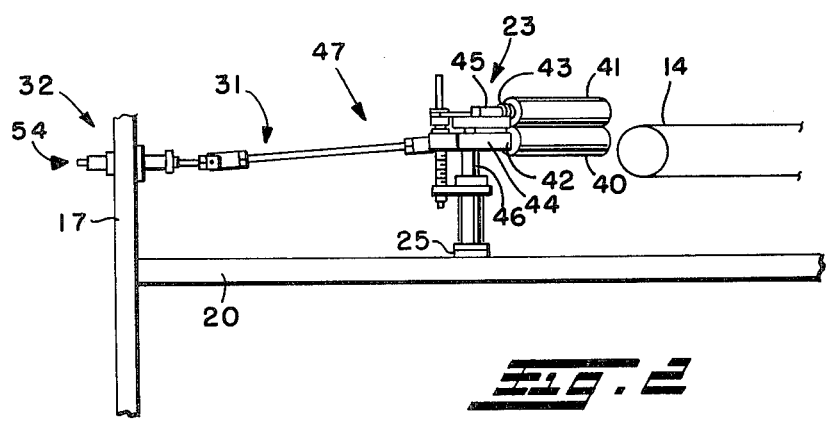
FIG. 2 is a side elevation view of one edge roll assembly and a remotely operable angle of attack adjusting mechanism therefor.

Turning now to FIG. 2, a roll assembly 23 includes a pair of cylindrical rolls 40, 41. The rolls 40, 41 preferably are straight cylinders provided with the elastomeric sleeve illustrated. Each has parallel vertically aligned longitudinal axes, and such rolls are mounted for rotation about respective shafts 42, 43, which are supported, in turn, by respective split mounting brackets 44, 45 secured to a main support tube/shaft 46. The top of the lower roll 40 preferably is approximately in a common plane with the top of the conveyor 14 and with the top of the bottom curved rolls (not shown) in the sets of curved rolls 13. Although that common plane is shown in FIG. 2 as a horizontal one to facilitate the illustration, it should be appreciated that in the preferred embodiment such common plane would be sloped downwardly from the extrusion die, for example, as is disclosed in U.S. Pat. No. 4,234,529. The upper roll 41 is movable vertically relative to the lower roll 40 to vary the spacing therebetween on opposite sides of the extrudate pass line. Moreover, both rolls 40, 41 are commonly pivotable about the axis 30 of the main support tube/shaft 46. Such pivotal movement is effected by pushing or pulling on the actuating arm 31 of the remotely operable angle of attack adjusting mechanism 47, which also includes a rigid linkage 50 (FIG. 1) for coupling the arm 31 to the lower mounting bracket 44. The rigid linkage 50 includes an elbow rod 51 connected by a jam nut 52 to the lower mounting bracket 44, as is seen in FIG. 6, and a clevis type connector 53 for coupling the rod 51 to the actuating arm 31. The rigid elbow rod 51 in its angled configuration and length is designed to provide the necessary movement arm for swinging the roll assembly and to extend directly normal to the extrudate path providing a substantially right angle connection with arm 31 at the mid-point of the range of adjustment of the angle of attack.

Referring now to FIG. 3, the actuating arm 31 provides a substantially rigid mechanical linkage between the adjustment end 54 thereof and the rigid linkage 50 capable of accommodating different angles of attack and heights of the rolls. The actuating arm 31 includes an adjustable, partly hollow shaft 55, adjustable rod 56, a first clevis connector 57, adjustable rod 58, and a second clevis connector 59 of which the clevis 53 is part. The adjustable shaft 55 passes through an opening 60 in the bulkhead 17. A vacuum seal 61 is held in position about the shaft 55 by a bracket 62 secured by fastener 63 to the bulkhead 17. The bracket 62 has a hollow longitudinal extension 64 through which the shaft 55 passes. A pair of split shaft collars 65, 66 and Oilite thrust washers 67, 68 secure the shaft 55 in fixed longitudinal relation relative to the bulkhead 17. Needle bearings 69 maintain the longitudinal axis thereof relatively fixed while permitting rotation of the shaft 55. Such rotation may be effected manually or automatically by the application of a torque to the squared adjusting end 54.

The adjustable shaft 55 has an internally tapped bore 70 opening toward the controlled environment 15, and the threaded rod 56 is threadedly secured in the passage 70. The rod 56 also is attached at a threaded connection 71 to the clevis 72 of the first clevis connector 57 and is locked in connection therewith by a jam nut 73. The clevis connectors 57, 59 also have spherical rod ends 74, 75 attached to the respective clevises 72, 53 by pins 76 in turn held in place by cotter pins 77. The threaded ends of the adjustable rod 58 are attached to the respective spherical rod ends 74, 75 at the illustrated threaded internal passages 78, 79 and are locked in position by jam nuts 80.

It will be appreciated that the effective length of the actuating arm 31 may be adjusted, for example during set-up of the foam extrusion apparatus 10, by adjusting the connections between the adjustable rod 58 and the clevis connectors 57, 59. By turning the shaft 55 in one direction or the other, for example using a torque applied to the adjusting end 54, the adjustable rod 56 is moved longitudinally relative to the shaft 55. Such longitudinal movement is coupled via the clevis connectors 57, 59 and rod 58 to the rod 51 to pivot the rolls 40, 41 about the main vertical support shaft 46.

Referring now to FIGS. 4–6, the lower roll 40 is rotatably mounted on the shaft 42. A split collar 90 and thrust washer 91 at the outer end of the roll hold the roll on the shaft. At the inner end of the roll 40 a thrust washer 92 and sprocket assembly 93 is provided with the latter journaled on shaft 42 and secured to roll 40. The thrust washer is interposed between the assembly 93 and a split mounting bracket 94, which in turn supports air motor 95 from an angle bracket 96. The motor 95 drives the roll 40 through chain 97 between the sprocket assembly 93 and sprocket 98 on the motor drive shaft 99. Controlled air pressure from a conventional supply, not shown, drives the air motor 95 thereby to rotate the roll 40 at a controlled speed.

The shaft 42 is secured in horizontally slotted recess 100 in the lower mounting bracket assembly 44 by clamp fasteners 101 (FIG. 6). Moreover, the lower mounting bracket assembly 44 is vertically split at 102 to permit clamping thereof by fastener 103 securely to the support tube 104 of the tube/shaft support 46. The support tube 104 is vertically movably and swingably mounted in a main support sleeve 105, which in turn is attached at a bottom flange to the support plate 25 (FIG. 1).

Ball bushings 106 mounted in the support tube 104 against lands 107 secure the main support shaft 108 of the tube/shaft 46 to maintain its axis 30 also in common with those of the support tube 104 and main support sleeve 105. The ball bushings 106 further facilitate vertical or axial movement of the main support shaft 108.

Rotatably mounted about the outside of the main support sleeve 105 and in engagement with the land 110 thereof is a lower rod support 111 held in place by a split collar 112. Threaded through a tapped opening 113 in the support 111 is the lower threaded end of guide shaft 114. The guide shaft 114 has a reduced cross section upper end 115 which passes through an opening 117 through the lower mounting bracket assembly 44, being positionally held therein by Oilite bushings 118 and a split shaft collar 119.

The upper end 115 of the guide shaft 21 also passes vertically through a ball bushing 120 in an opening 121 through rearward extension plate 122 secured on the upper mounting bracket assembly 45. The guide shaft 114 helps to maintain the upper roll 41 in true parallel relation with the lower roll 40 as the former is raised and lowered. The guide shaft 114 also may be turned by force applied at its lower squared end 123 when the clamp fastener 103 of the lower mounting bracket assembly 44 is loosened to adjust the vertical height of the lower roll 40, for example, to bring the same below, into or above the plane of the conveyor 14 and/or of the lower rolls of the curved set of rolls 13. After such vertical height adjustment of the lower roll 40 is made, the fastener 103 is tightened again to secure the lower mounting bracket assembly 44 to support tube 104.

In the illustrated embodiment of the invention the upper roll 41 is not driven, although, if desired, it may be by the motor shown or by its own. The roll 41 is rotatably mounted on the upper shaft 43 by a pair of split shaft collars 130 and thrust washers 131. The shaft 43 in turn is secured by fasteners 132 to the top of the upper mounting bracket assembly 45. Appropriate bearings or other means may be provided to facilitate rolling of the respective rolls 40, 41 about the respective shafts 42, 43.

The upper mounting bracket assembly 45 is also vertically split at its rear end is secured to the upper end of the main support shaft 108 by tightening a clamp fastener 140. The shafts 108 and 114 cooperate to maintain parallel alignment of the upper roll 41 relative to the lower roll 40, such that the straight longitudinal axes of such rolls remain parallel and in a common vertical plane as the upper roll 41 is displaced vertically relative to the lower roll.

An air cylinder assembly 141 effects such vertical movement of the upper roll 41. The air cylinder 141 is attached by a rod end cap 142 to the underside of lower mounting bracket assembly 44. The piston rod 143 of cylinder assembly is connected to a rod extension 144, which has a flanged upper end 145 captured in a rod retainer plate 146. Such rod retainer plate is attached to the underside of upper mounting bracket assembly 45 by fasteners 147 (FIG. 5). The rod extension 144 passes through an opening provided therefor in the lower mounting bracket assembly 44 and in the lower roll shaft 42. The air cylinder 141 preferably is of the type disclosed in U.S. Pat. No. 4,234,529; such air cylinder is coupled to a controlled source of air pressure and venting (not shown) accurately to control both the spacing between the rolls 40, 41 and the pressure exerted thereby on the extrudate passing therebetween. As in such patent, pressure is applied beneath the piston to cause the upper roll to float compensating for its tare weight, and finely controlled pressure above the piston controls the pressure of the roll against the foaming extrudate, and, of course, the pressure of the extrudate against the lower driven roll.

OPERATION

In operation of the foam extrusion apparatus 10, for set-up purposes the spacing between the roll assemblies 23 is adjusted by adjusting the relative positions of the support plates 25, and the length of respective actuator arms 31 and the initial orientation for the angle of attack of the rolls 40, 41 relative to the extrudate 21. Other fine adjustments may be obtained by the clevis connectors 57, 59 and rod 58. Such angle of attack also may be adjusted by turning the adjusting end 54 of the shaft 55. An initial vertical separation of the respective pairs of rolls 40, 41 also may be adjusted by appropriately controlling the air supply to and venting from the air cylinder 141, and similar adjustments can be made at the sets of curved rollers 13 and conveyor 14, for example, as is described in U.S. Pat. No. 4,234,529. Also, the speed of rotation of the air motor 95 and, thus, the lower roll 40 is initially set.

Using the foam extrusion apparatus 10 in the extruding process, the extrudate is conducted through the sets of curved rolls 13 being shaped thereby to an extent tending to obtain a relatively wide finished extrudate although the width of the issuing extrusion die orifice 12 is relatively narrow. The roll apparatus 22 has a further drawing and control shaping effect on the extrudate downstream of the curved rolls 13 tending further to control the extrudate to the desired width. Accurate control of the height of the upper rolls 41 by the air cylinder 141 will affect the force applied by the rolls to the extrudate and thus any traction or draw; such force ordinarily would be selected to exert on the extrudate 21 a force of desired controlled magnitude to obtain the desired width with a minimum of distortion or destruction of the individual cells of the foam extrudate. Further, by enlarging the angle of attack of the roll assemblies 23, for example by rotating respective shafts 55 and, thus, lengthening or shortening the arms 31 even while the extruding process is proceeding in a vacuum, the vector of applied force can be increased or, conversely, by decreasing such angle, can be decreased.

STATEMENT OF INDUSTRIAL APPLICATION

In view of the foregoing, it will be appreciated that the method and apparatus of the present invention is useful in the extruding of a foamable material from a relatively narrow extrusion die orifice to form a relatively wide extrudate.

We claim:

1. A method of controlling and shaping a foaming extrudate exiting from a die orifice, comprising the steps of directing the extrudate through and in engagement with a set of rolls that extend at least substantially across the surfaces of the extrudate on opposite sides thereof, further directing only the opposite edge portions of the extrudate through and in engagement with respective pairs of further rolls downstream of the set of rolls, and adjusting such respective pairs of further rolls for controlled edge forming of the extrudate.

2. The method of claim 1, further comprising applying a driving force to the edge portions of such extrudate by such further rolls.

3. The method of claim 2, further comprising adjusting the compressive force applied by such further rolls to such extrudate.

4. The method of claim 2, further comprising adjusting the angle of attack of such further rolls relative to the travel direction of such extrudate.

5. The method of claim 2, further comprising adjusting the spacing between the respective further rolls of such pairs.

6. The method of claim 2, further comprising adjusting the spacing between respective pairs of further rolls.

7. The method of claim 4, further comprising maintaining a vacuum environment at such die orifice, set of rolls and respective pairs of further rolls, and said adjusting comprising pivoting such respective pairs of further rolls from a location remote from such vacuum environment.

8. The method of claim 5, further comprising maintaining a vacuum environment at such die orifice, set of rolls and respective pairs of further rolls, and said adjusting comprising adjusting the spacing of such respective pairs of further rolls from a location remote from such vacuum environment.

9. The method of claim 2, further comprising driving at least one of such further rolls in each pair thereof to rotate the same independently of the extrudate passing therethrough.

10. In a foam extrusion apparatus for forming foam boards, billets and the like, a shaping roll assembly adapted to be positioned near the extrusion die of the apparatus for edge forming such boards, billets and the like, said shaping roll assembly comprising two pairs of straight rolls mounted to receive respective edges of such foam boards or billets therebetween, and pivot adjustment means to pivot said rolls of each pair about a common axis normal to the extrudate path for adjusting the angle of attack of said rolls relative to the travel direction of such extrudate to control shaping of the extrudate to a desired width.

11. The apparatus of claim 10, further comprising means to adjust the spacing between said rolls of each pair while maintaining the axes thereof in parallel and in a common plane.

12. The apparatus of claim 11, further comprising means to rotate at least one of said rolls of each pair.

13. The apparatus of claim 12, wherein said one of said rolls of each pair is the bottom roll.

14. The apparatus of claim 13, including means to adjust the elevation of said rolls of each pair as a unit.

15. The apparatus as set forth in claim 10, including means to float by pressure the upper of said rolls, of each pair and to urge said upper roll downwardly with controlled opposite pressure.

16. The apparatus as set forth in claim 10, wherein said roll assembly is in a vacuum chamber, and said means to pivot said rolls of each pair extends outside said vacuum chamber.

17. The apparatus set forth in claim 16, wherein rotation of said means to pivot outside said vacuum chamber is converted to linear motion inside said vacuum chamber.

18. A foam extrudate forming apparatus adapted to be positioned near the extrusion die, comprising curved shaping rolls positioned on opposite sides of the extrudate path downstream of the extrusion die orifice, straight rolls positioned on opposite sides of the extrudate path downstream of said curved rolls for assisting in shaping the extrudate, and means for adjusting the spacing between said straight rolls controllably to provide a uniform thickness to the extrudate.

19. A foam extrudate forming apparatus adapted to be positioned near the extrusion die, comprising curved shaping rolls positioned on opposite sides of the extrudate path downstream of the extrusion die orifice, straight rolls positioned on opposite sides of the extrudate path downstream of said curved rolls for assisting in shaping the extrudate, and means for adjusting the angle of attack of said straight rolls relative to the extrudate path to control shaping of the extrudate to a desired width.

20. The apparatus of claim 19, further comprising a controlled environment for containing the extrusion die orifice and said curved and straight rolls, and said means for adjusting comprising a remotely operable rigid linkage for effecting such adjustment from a location outside said controlled environment.

21. The apparatus of claims 18 or 19, said curved rolls extending substantially completely across respective surfaces of the extrudate and said straight rolls being positioned, respectively, on both sides of the extrudate only at respective opposite edge portions thereof.

22. A foam extrudate forming apparatus adapted to be positioned near the extrusion die to form a foam extrudate having opposite surfaces and respective edge portions, comprising curved rolls positioned on opposite sides of the extrudate path downstream of the extrusion die orifice operative to form and confine the extrudate, and means to apply a controlled traction force to the extrudate at a non-parallel angle relative to the principal travel direction of the extrudate, and means to adjust the magnitude of such force controllably to obtain the desired shape of the extrudate without crushing or cell distortion.

23. In combination, a foam extrusion die having an arcuate orifice, generally arcuate rolls on opposite sides of the extrudate path downstream of said orifice, each roll extending at least substantially across the surface of the extrudate for confining engagement therewith, and two additional pairs of rolls, each pair being positioned at a respective edge portion of the extrudate on opposite sides of the extrudate path, and adjusting means to adjust the position of said additional pairs of rolls for controlled edge forming of the extrudate.

24. The combination of claim 23, wherein at least one of each of said additional pairs of rolls is driven.

25. The combination of claim 24, wherein each of said rolls comprises a straight cylinder.

26. The combination of claim 24, further comprising means for adjusting the spacing between each additional pair of rolls.

27. The apparatus of claim 24, further comprising means for adjusting the angle of attack of each additional pair of rolls relative to the travel direction of an extrudate.

28. The apparatus of claim 24, further comprising means for adjusting the spacing between the respective additional pairs of rolls.

* * * * *